United States Patent [19]

Booth et al.

[11] 3,708,654

[45] Jan. 2, 1973

[54] READER SYSTEM FOR CONVENTIONAL CREDIT CARDS

[75] Inventors: William M. Booth, Grand Haven; Robert E. Westrick, Muskegon, Mich.

[73] Assignee: Bennett Pump Incorporated, Muskegon, Mich.

[22] Filed: May 26, 1971

[21] Appl. No.: 147,098

[52] U.S. Cl. .............................................235/61.11 A
[51] Int. Cl. ..............................................G06k 7/06
[58] Field of Search..235/61.11 R, 61.11 A, 61.11 C, 235/61.11 F, 61.7 B; 200/46; 340/149, 149 A

[56] References Cited

UNITED STATES PATENTS

| | | | |
|---|---|---|---|
| 3,299,298 | 1/1967 | Schinner | 235/61.11 C |
| 3,308,253 | 3/1967 | Krakinowski | 235/61.11 C |
| 3,463,890 | 8/1969 | Schinner et al. | 235/61.11 C |
| 3,576,407 | 4/1971 | Stephans, Jr. | 200/46 |
| 3,617,666 | 11/1971 | Braue | 200/46 |

Primary Examiner—Daryl W. Cook
Attorney—Thomas M. Marshall

[57] ABSTRACT

A system for electrically reading the customer account number or other embossed information on a conventional plastic credit card includes a reader means having a plurality of electrical contact matrices, each of which is designed to read any of the figures zero through nine. A metal foil tape is positioned between the reader means and the embossed figures on the credit card, whereby an electrical charge passed through the tape actuates the probes of the various contact matrices, and provides intelligence information to various electrical relay trees (or electric equivalent) for obtaining a complete read-out of the customer's account number. This intelligence information may then be provided to an invoice printer or, alternatively, to an imprinter where the electrical read-out from the imprinter could be fed directly into tape punching apparatus, dataphone, magnetic tape, teletype, or other data processing equipment.

5 Claims, 19 Drawing Figures

PATENTED JAN 2 1973 3,708,654
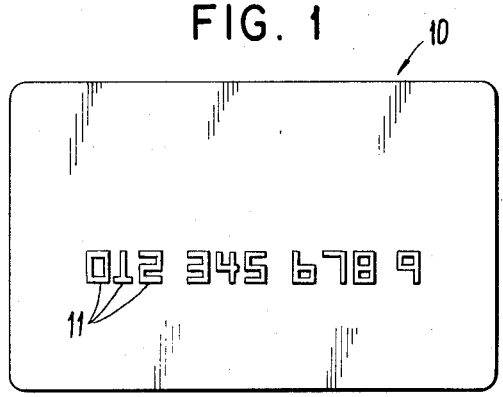
FIG. 1
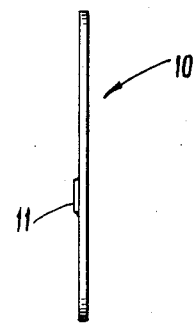
FIG. 2
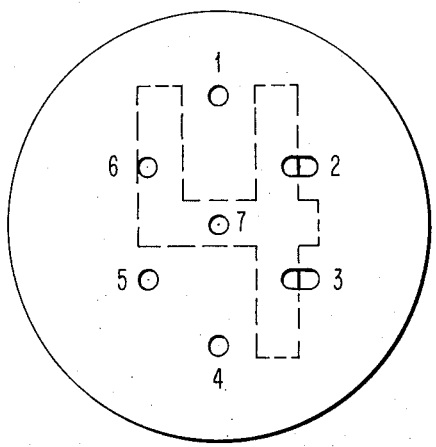
FIG. 3
| MATRIX CONTACT NUMBER | | | | | | | | | | | |
|---|---|---|---|---|---|---|---|---|---|---|
| 1 | X | X | X | X |   | X |   | X | X | X |
| 2 | X |   | X | X | X |   |   | X | X | X |
| 3 | X |   |   | X | X | X | X | X | X | X |
| 4 | X | X | X | X |   | X | X |   | X |   |
| 5 | X |   | X |   |   |   | X |   | X |   |
| 6 | X |   |   |   | X | X | X |   | X | X |
| 7 |   | X | X | X | X | X | X |   | X | X |
FIG. 4
INVENTOR.
WILLIAM M. BOOTH
BY
Thomas M. Marshall
ATTORNEY

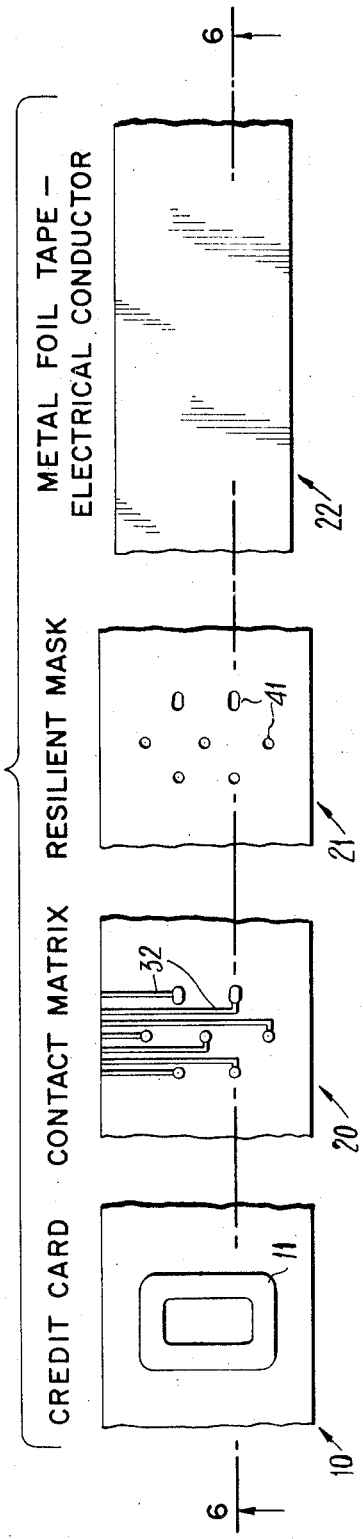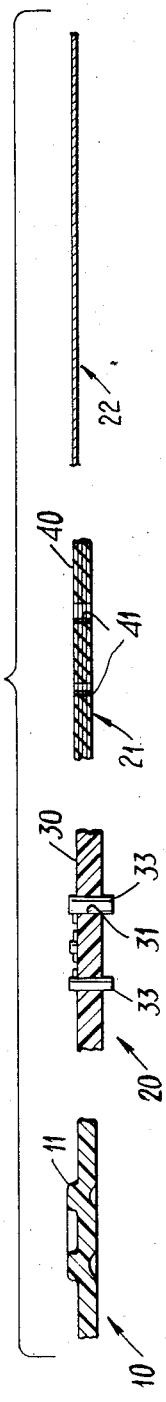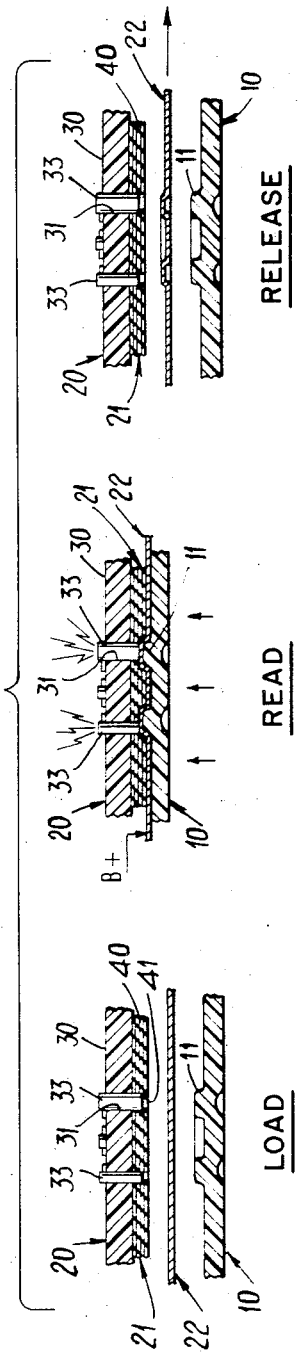

CONDUCTIVE PATH FOR "THREE"

CONDUCTIVE PATH FOR "FIVE"

CONDUCTIVE PATH FOR "SIX"

CONDUCTIVE PATH FOR "EIGHT"

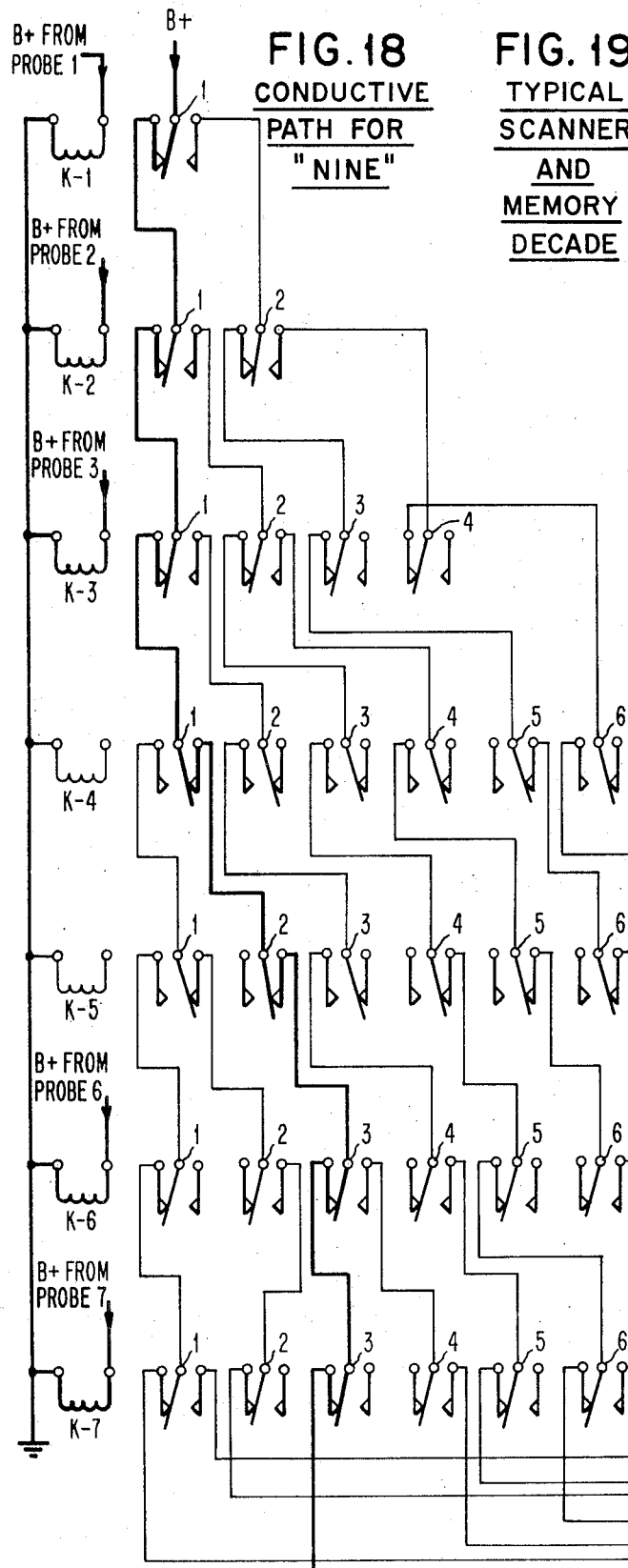
FIG. 18 CONDUCTIVE PATH FOR "NINE"
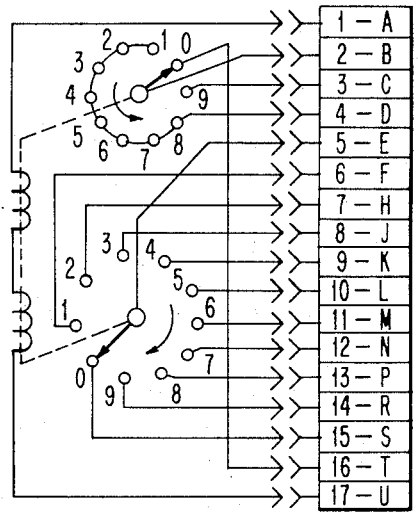
FIG. 19 TYPICAL SCANNER AND MEMORY DECADE
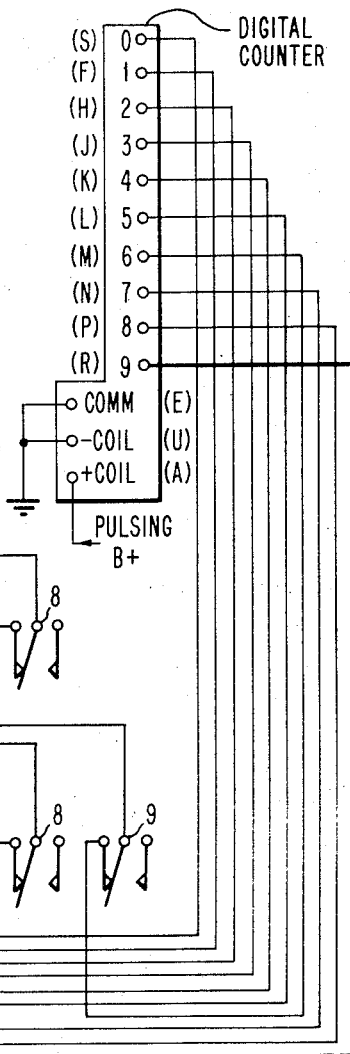

READER SYSTEM FOR CONVENTIONAL CREDIT CARDS

The present invention relates to an apparatus for electrically reading the customer account number or other indicia from a conventional plastic credit card. As described in this disclosure, a conventional credit card of the plastic variety is generally defined by a rectangularly shaped plastic card having embossed or raised figures which are used for identifying the account number or other indicia of the credit card holder.

For purposes of convenience, the apparatus of the subject invention will be described when used in conjunction with gasoline dispensing systems.

A substantial percentage of the sales made of gasoline products at a service station are credit card charged sales to the owners of automobiles. Credit cards which have been issued by oil companies usually have both the name of the person to whom the credit card was issued, and his account number identification embossed on the plastic credit card in machine readable characters.

In common usage, during the sale of gasoline products by the service station, the credit card is placed in an apparatus of a well-known type and a multiple-copy invoice is imprinted by use of the card. The amount of the sale, number of gallons, etc. is written in by the attendant at the service station, with one copy of the invoice retained by the service station operator, while another copy is given to the credit card purchaser, and the remaining copies are forwarded to the accounting department of the oil company.

The invoice which is forwarded to the oil company is then scanned using well-known types of scanning apparatus, and a machine punched tabulating card is prepared. It then becomes necessary for the accounting department to manually punch the tabulated machine card with the total amount of the sale, and other data, if desired. Usually, the accounting department only manually punches the tabulating machine card to indicate the total amount of the sale. In forwarding monthly billings to the customer, the oil company normally will provide the customer with a punched tabulating machine card which will show the total amount due for all purchases made during a certain period, along with copies of the separate invoices which are only totalled on the bill.

Because of the widespread use of credit cards, millions of individual transactions by credit card holders are handled by an oil company's accounting department, and accordingly relatively long time intervals elapse between the time of sale and the billing to the customer.

One of the problems which is inherent in a system of the type described is a lack of clarity of the imprinted information formed on the invoice. This may be caused by various conditions, one of which is a very common one in service station operations, and is a result of the dirt and grease associated with a service station. More particularly, the attendant who pumps the gas may also be involved in repairing automobiles and accordingly, as he places the plastic credit card in the apparatus for forming the imprinted invoice he may smear dirt or grease substances on the credit card so as to affect the clarity or quality of the imprinted information. As is readily apparent, without a clear invoice which can be readily used by the accounting department of the oil company, a great deal of time and money are wasted in preparing the invoices and bills to be forwarded to the customer.

Another problem associated with known devices is that they contain a great deal of moving parts which are readily susceptible to jamming or malfunctioning which could also lead to poorly imprinted invoices. Still another problem associated with present systems is that only one record of the sale is obtained, that being the multiple copy invoice which is manually prepared by the attendant. Also inherent in known systems of recording credit card transactions is the number of times that each invoice is handled, and the time lapse between recording of the transaction and billing. This time lapse hinders the identifying of delinquent accounts and also the recognition by the service station operator of stolen credit cards.

The object of this invention is to provide an electrical reader which is usable with a credit card of generally conventional character, that is, the typical embossed plastic card which may be used with the pressure printing equipment in common use.

It is the further object of this invention to provide an electrical reader apparatus which provides intelligence information for immediate transmission to the accounting department of an oil company in order to facilitate the rendering of current bills for charged products. Also, to facilitate identification of delinquent accounts and in recovering stolen credit cards.

It is another object of this invention to provide an electrical reader means constructed without mechanical working parts of an electrical contact nature such as relay contacts, sense pointing contacts, etc., thereby increasing the reliability of the system, while simultaneously minimizing wear and tear on the plastic credit card.

It is another object of this invention to provide an electrical reader apparatus capable of providing more than one record of a sales transaction using a conventional plastic credit card.

It is still a further object of this invention to provide a conventional credit card reader which is relatively simple and inexpensive, yet extremely reliable.

To accomplish these foregoing general objects, and other more specific objects which will hereinafter appear, or hereinafter more particularly described in the following specification and drawings in which:

FIG. 1 is a plan view of a conventional plastic credit card;

FIG. 2 is a side view of the credit card of FIG. 1;

FIG. 3 illustrates a single electrical contact matrix forming a portion of the subject reader apparatus;

FIG. 4 is a tabulation of the probes of the contact matrix which would be actuated by the respective numerals "zero" through "nine;"

Figure 8:
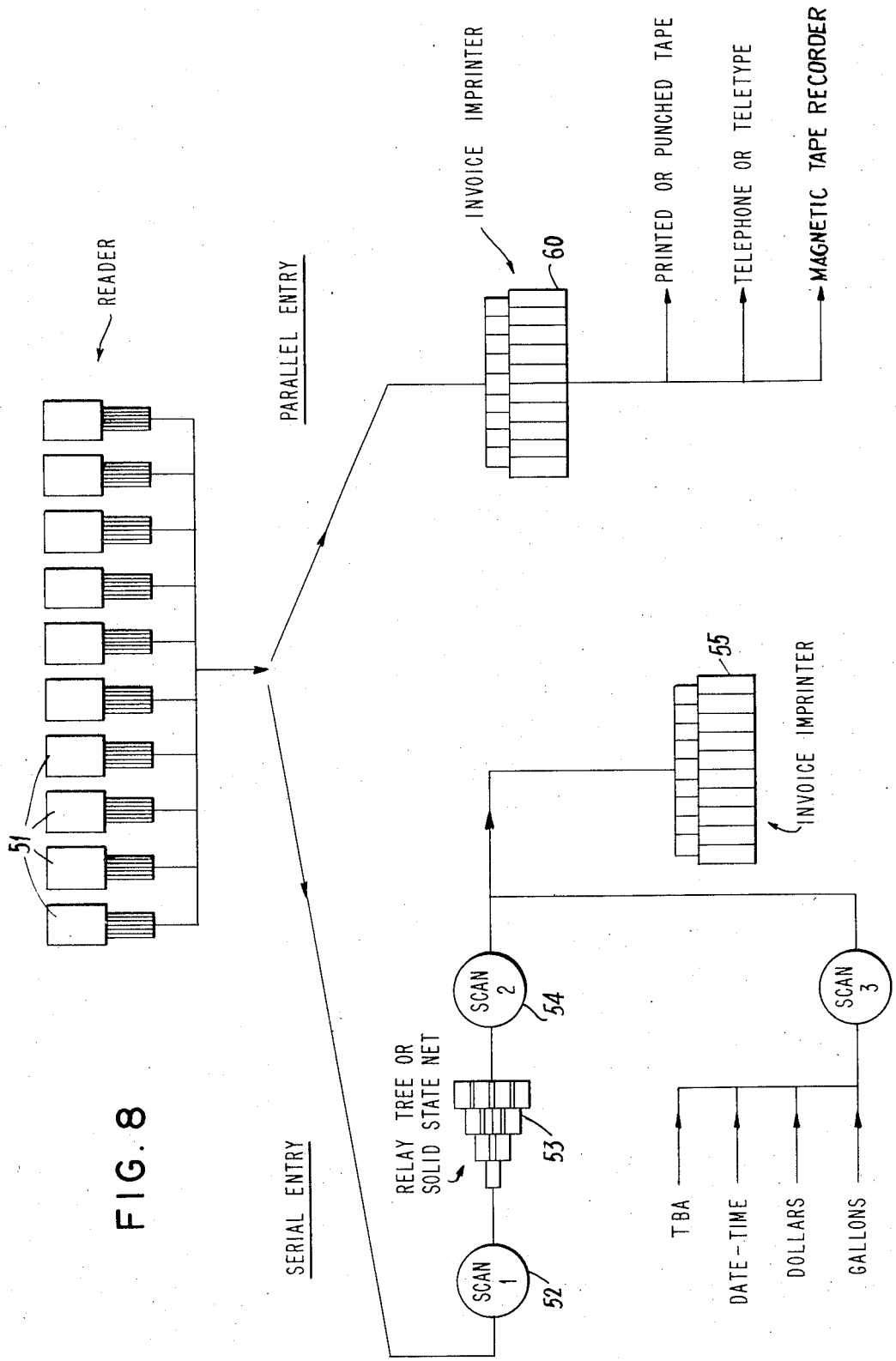
Figure 9:
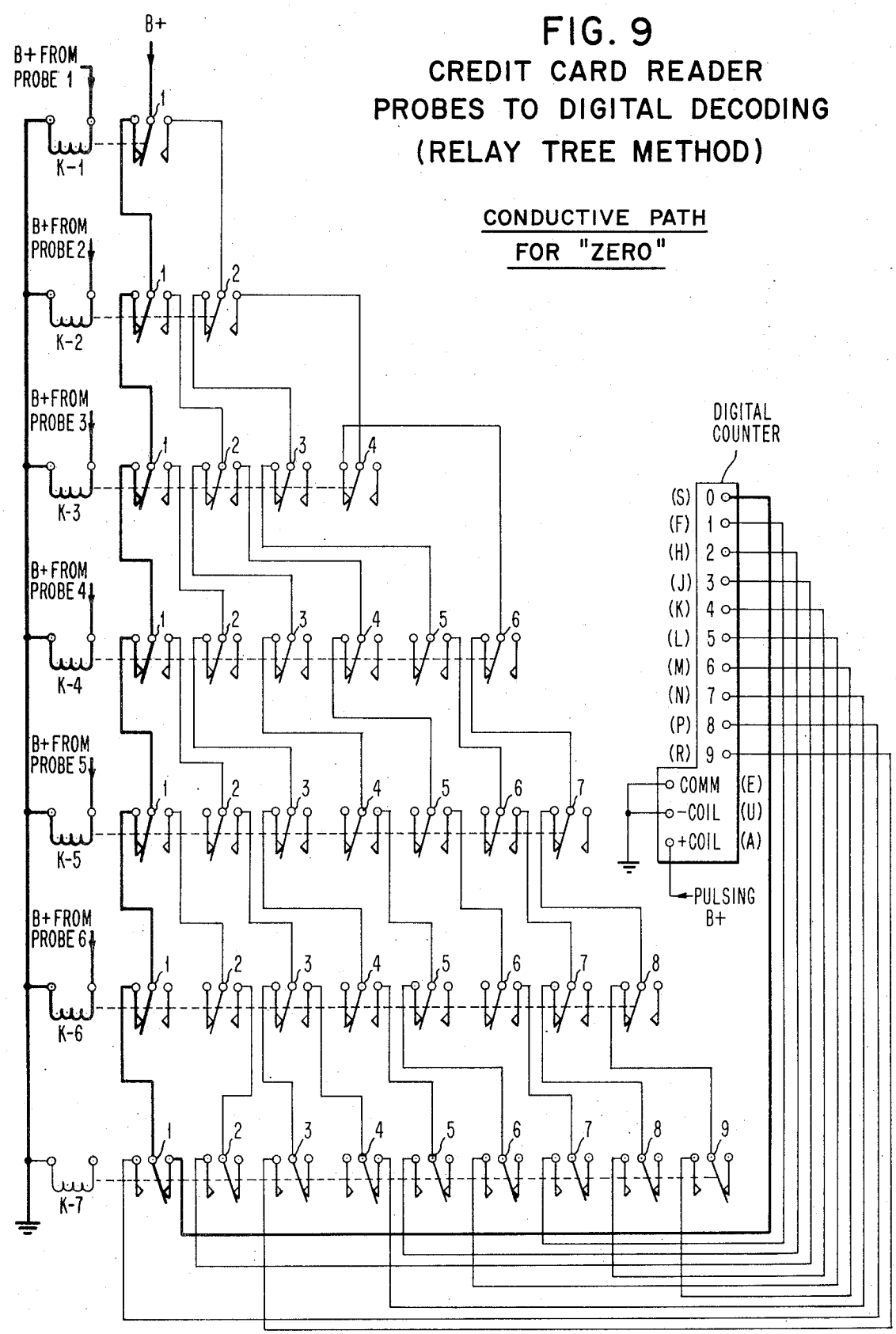
Figure 10:
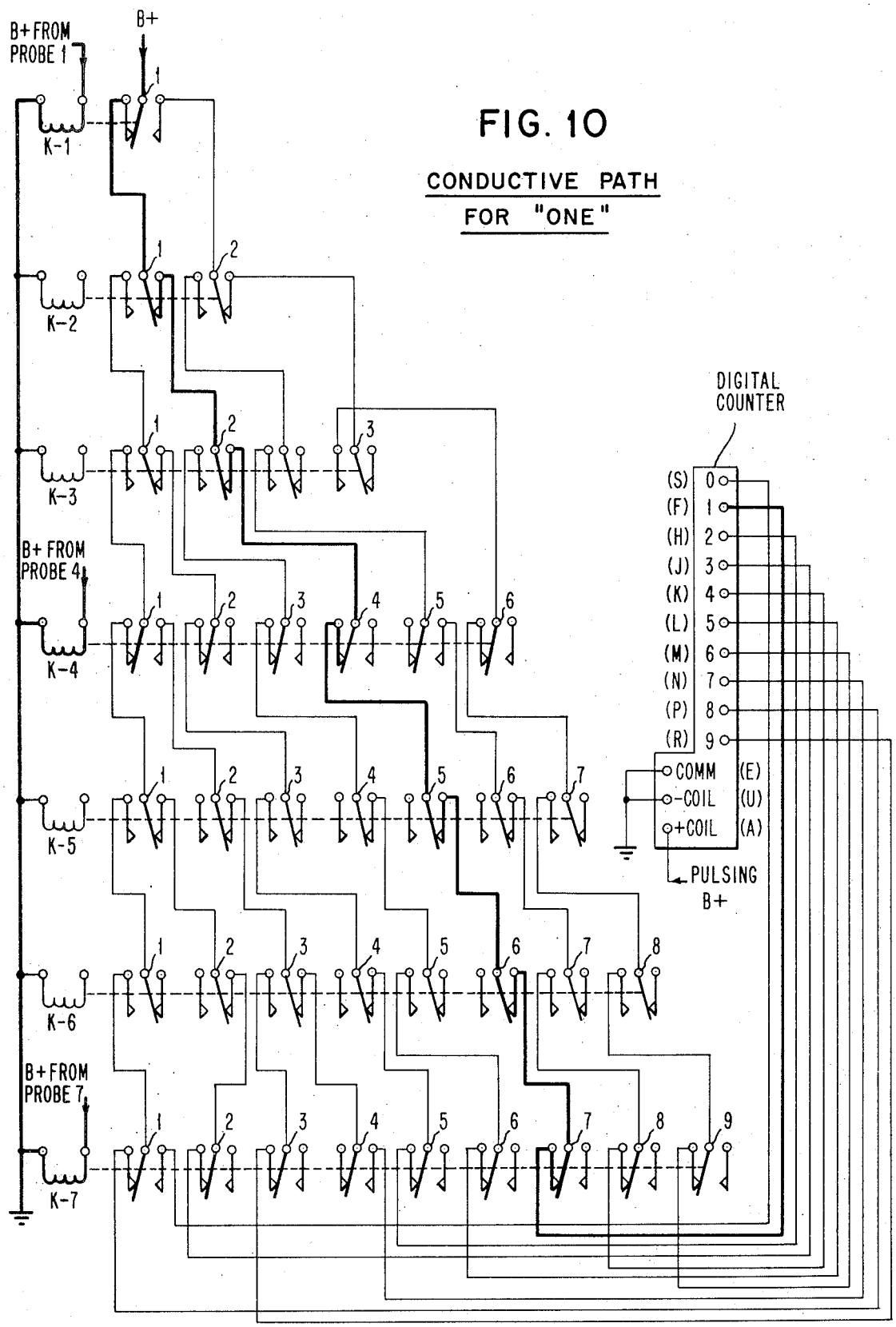
Figure 11:
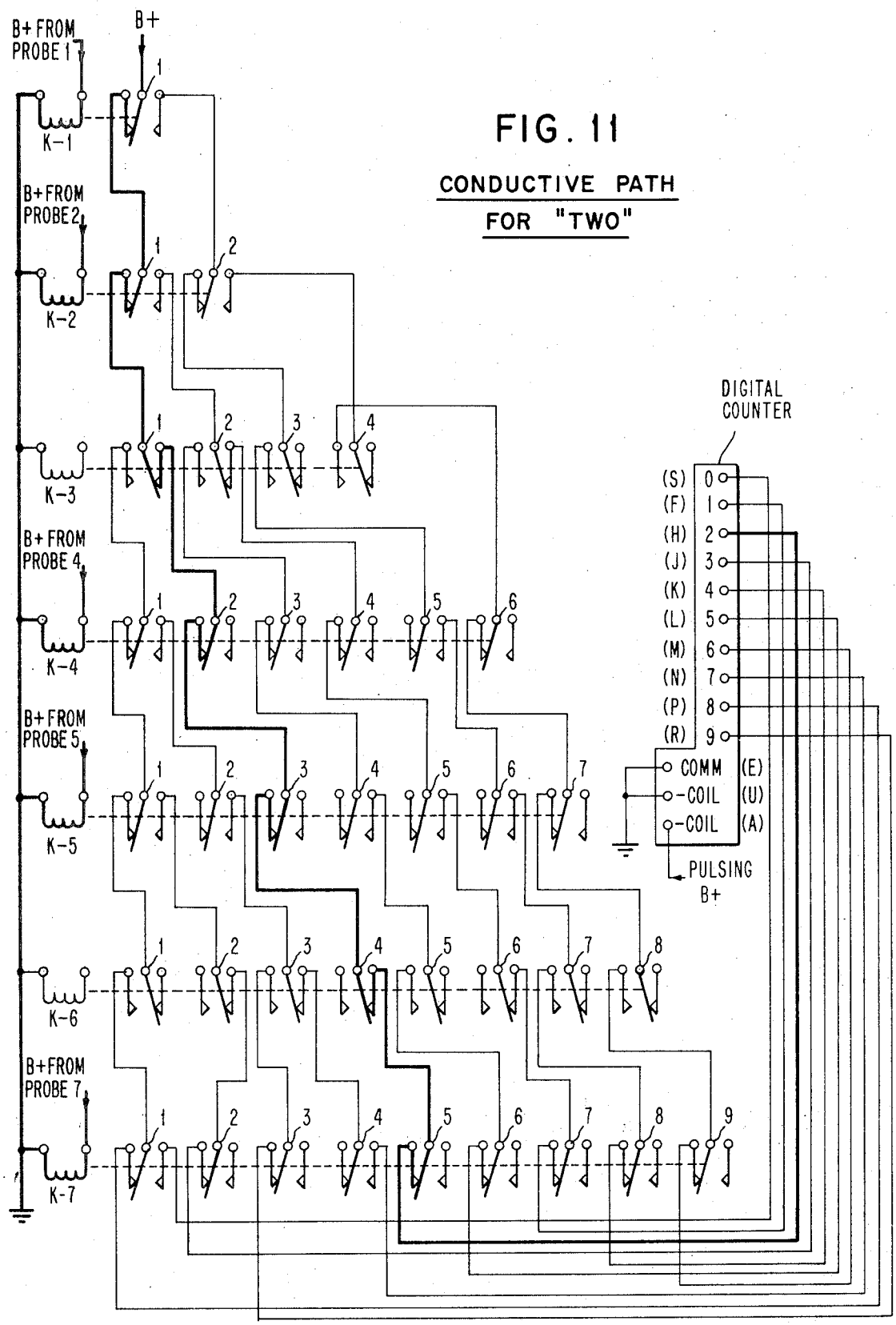
Figure 12:
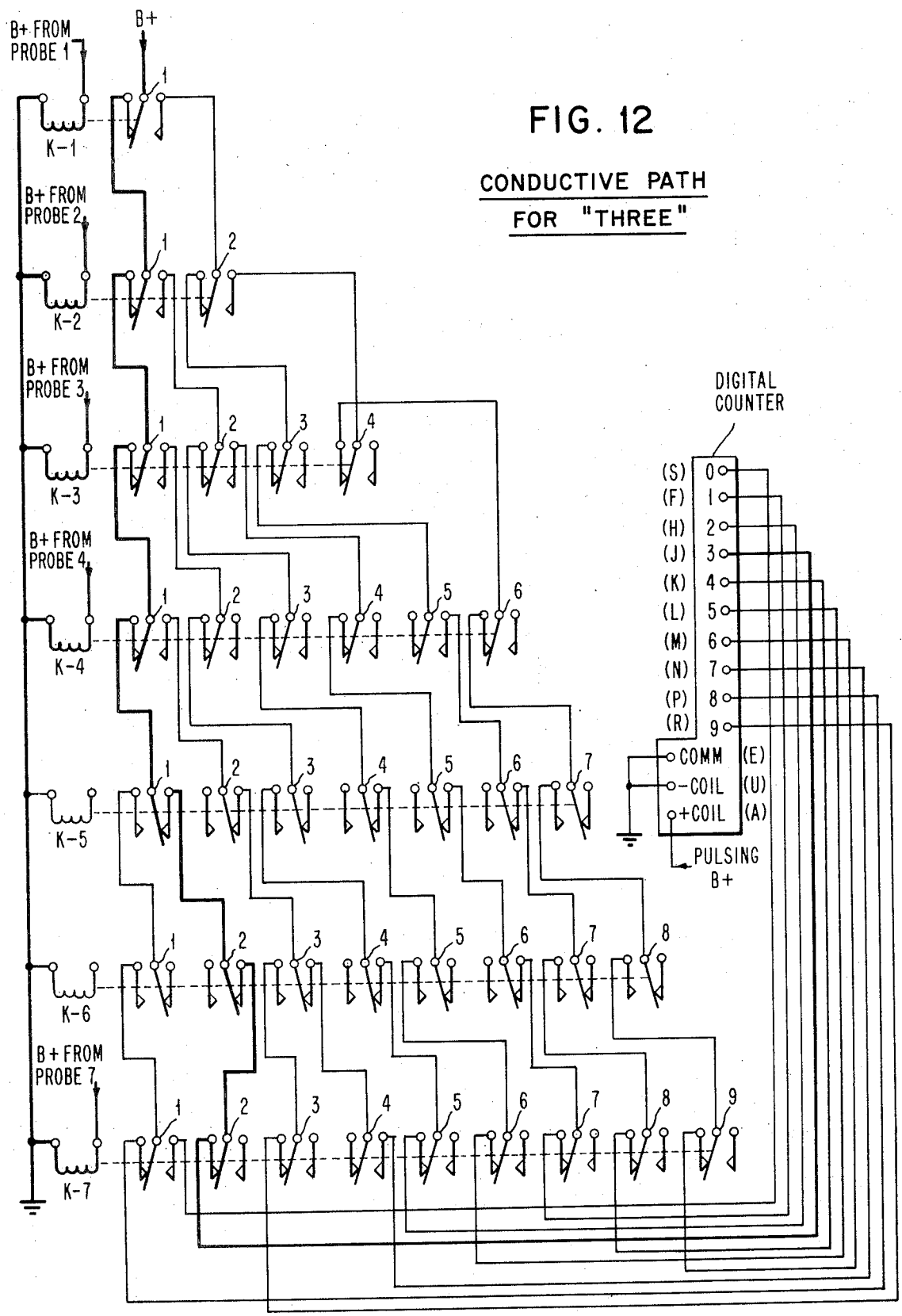
Figure 13:
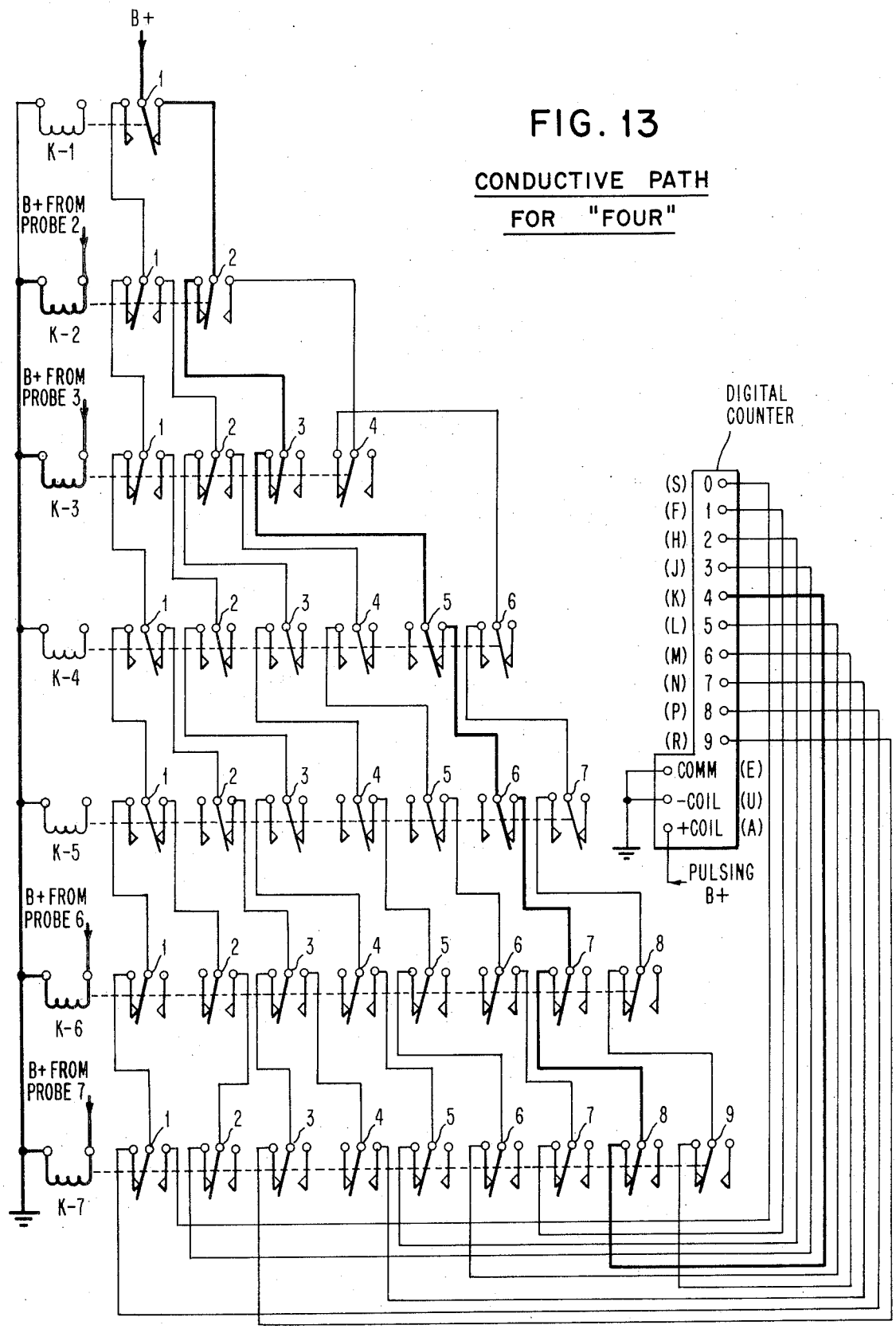

FIG. 5 illustrated an exploded plan view of the elements forming a contact matrix of the subject reader apparatus, along with a section of a conventional credit card;

FIG. 6 is a view taken along line 6—6 of FIG. 5;

FIG. 7 illustrates in sequence the three operational positions of the reader apparatus of the subject invention in combination with a conventional credit card;

FIG. 8 is a schematic view of several alternate systems in which the subject reader apparatus may be employed;

FIG. 9 illustrates a relay tree associated with the reader apparatus of the subject invention, with the conductive path for the reading of the "zero" numeral being shown in darkened lines;

FIGS. 10–18 illustrate the relay tree of FIG. 9, but with the darkened lines respectively designating the conductive paths for the numerals "one" through "nine"; and FIG. 19 illustrates a typical scanner and memory decade which may be employed in conjunction with the reader apparatus of the subject invention.

Turning to FIGS. 1 and 2, a credit card 10 of the common plastic variety is shown having raised or embossed account numerals 11 for imprinting sale invoices at the point of sale. For purposes of illustration, the credit card 10 is shown only with numerals forming the account number of the credit card holder, whereas conventional credit cards may also include the embossed name of the credit card holder and other indicia such as the expiration date of the credit card, etc. The reader apparatus of the subject invention, to be more fully described hereinafter, includes a plurality of electrical contact matrix assemblies, one of which is illustrated in FIG. 3 as comprising an arrangement of seven probes. The probes are designated by the figures 1 through 7 with the first six probes being arranged in an array around the central probe 7. The probes designated by the figures 2 and 3 are generally elongated, whereas the remaining probes 1, 4, 5, 6, and 7 are generally circular. In addition, the probes 1, 4, and 7 are slightly offset left of the center of the matrix to accommodate reading of the numeral four, to be more fully described.

FIG. 4 is a tabulation of the probes of a matrix assembly which are effectively contacted by the respective numerals zero to nine when an embossed figure on a conventional credit card 10 is placed over the contact matrix of the type shown in FIG. 3. For example, the numeral five will actuate or contact the matrix probes designated 1, 3, 4, 5 and 7. On the other hand, the numeral one contacts matrix probes 1, 4, and 7. As is readily apparent, no two numerals contact the same number or arrangement of matrix contact probes.

FIG. 5 illustrates an exploded plan view of a credit card and the elements making up a portion of the reader apparatus of the subject invention. Each contact matrix assembly of the reader apparatus includes the contact matrix 20, a resilient mask 21 and a metal foil tape 22 which is electrically conductive. Contact matrix 20 comprises a substrate 30 having a plurality of holes 31 extending therethrough in the probe arrangement illustrated in FIG. 3. A generally cylindrical, electrically conductive element defining the probe 33 is fixedly secured in each hole 31, and leads 32 (formed on the substrate) extend from each probe to the edge of the substrate for connection to the associated electrical components of the reader apparatus. Each probe extends beyond the upper and lower surfaces of the substrate and is fixedly connected thereto. The contact matrix may readily be formed by providing holes in a substrate for the probes, and laminating a sheet of copper material to the substrate, followed by etching of the copper substrate to remove excess material to define the leads 32 extending from the probes.

The resilient mask 21 comprises a flexible, resilient sheet of material 40, e.g., rubber, having seven apertures 41 therein corresponding in arrangement to the probes illustrated in FIG. 3. Finally, the metal foil tape 22 is a strip of flexible and deformable electrically conductive material of a width sufficient to cover the arrangement of the seven probes of the contact matrix.

FIG. 7 (a)–(c) illustrates the three operational positions of a contact matrix assembly forming a portion of the reader apparatus of the subject invention. The "load" position of the matrix assembly is illustrated in FIG. 7(a) wherein the embossed numeral 11 of credit card 10 is disposed toward the intermediate metal foil tape 22, with the resilient mask being positioned on the opposite side of the metal foil tape, and the contact matrix being in contact with the resilient mask and with the probes 33 extending through the holes 41 in the mask 40. In this load position, the elements are arranged preparatory to a "read" operation.

FIG. 7(b) illustrates the read phase of operation of the contact matrix assembly, at such time an electrical charge B+ is passed through metal foil tape 22 thereby generating an electric current in those probes 33 which are in contact with the metal foil tape by virtue of the configuration of the embossed numeral on the credit card. These signals are passed through the associated leads 32 to suitable switching mechanisms, to be described hereinafter, for developing the intelligence information desired. The final phase of operation of the matrix contact assembly is illustrated in FIG. 7(c) wherein the elements are returned to their original load position, at which time it is noted that the metal foil tape 22 has been permanently deformed to provide a second record (in addition to the signals developed by the contact matrix assembly) which is a permanent record of the recording of the account number on the credit card. The deformed or embossed portion of the metal foil tape would then advance after the reading, thereby providing a permanent record of the reading. If desired, the metal foil tape may be made of a material which is not permanently deformed or embossed during a read operation whereby the tape would be continually reused, and only one source of intelligence would be obtained through the use of the subject contact matrix assembly.

The electrical charge on the metal foil tape 22 may be of a positive or a negative potential. In addition, the metal foil tape 22 may be of the magnetic tape variety in which case the sensing points or probes of the matrix would apply a magnetic pattern to the tape, with the tapes being in a static position during reading. After a reading, the magnetic tape would be advanced and subsequently read out in a dynamic condition over a conventional magnetic tape head apparatus in much the same fashion as a magnetic tape recording and playback.

The contact matrix assembly illustrated in FIGS. 3 and 5–7 is only one portion of the reader apparatus of the subject invention. In a practical apparatus, the number of contact matrix assemblies would correspond to the numerals desired to be read from a conventional credit card. Accordingly, with the conventional credit card as illustrated in FIGS. 1 and 2, the reader apparatus would be required to have at least 10 contact matrix assemblies in order to read each of the embossed numerals 11 on card 10.

FIG. 8 schematically illustrates the reader apparatus of the subject invention as including a plurality of contact matrix assemblies 51, all of which provide a similar output of intelligence information which is input to a serial entry system wherein the intelligence is first scanned as at 52, and then passed through a relay tree 53 or alternatively, a solid state network. The resulting signals are then scanned through a second scanner 54, and are then conducted to an invoice imprinter 55. Also input to the invoice imprinter 55 would be additional intelligence information corresponding to other entries to be provided on the customer's invoice including TBA (tires, batteries, accessories), the date and time of the sale, the dollar amount of the sale, and the number of gallons of the sale. This additional intelligence is passed through a scanner 54 for processing and then provided to the invoice imprinter 55.

FIG. 8 also illustrates a parallel entry of the intelligence information developed by the contact matrix assembly wherein use is made of solid state input to an invoice printer or imprinter 60. Electrical readout from imprinter 60 is fed directly into a printed or punched tape, telephone or teletype, or magnetic tape recorder for immediate transmission to the accounting department of the oil company.

FIGS. 9–18 illustrate relay trees 52 which may be used in conjunction with the contact matrix assemblies, with FIGS. 9–18 respectively illustrating in darkened lines the conductive paths generated by numerals zero through nine, formed on the credit card. Although relay trees are described with reference to the subject system, it is apparent that other electronic equivalents to the relay trees may be employed, e.g., the use of discrete components or integrated circuit assemblies.

Along the left side of the illustrated relay trees are the various probes 1 through 7 corresponding to the probes of the contact matrix assemblies illustrated in FIGS. 3 and 5.

Figure 14:
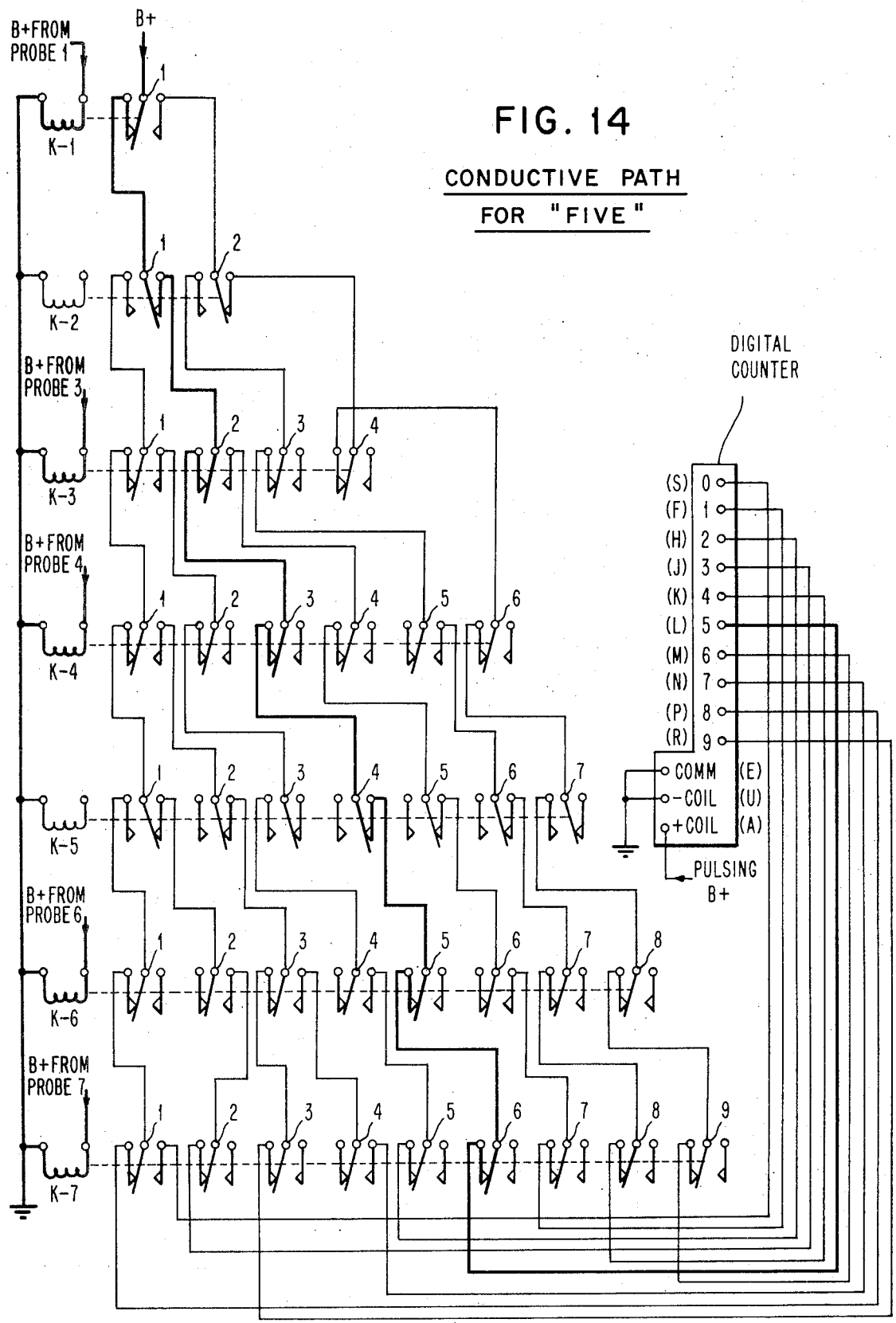
Figure 15:
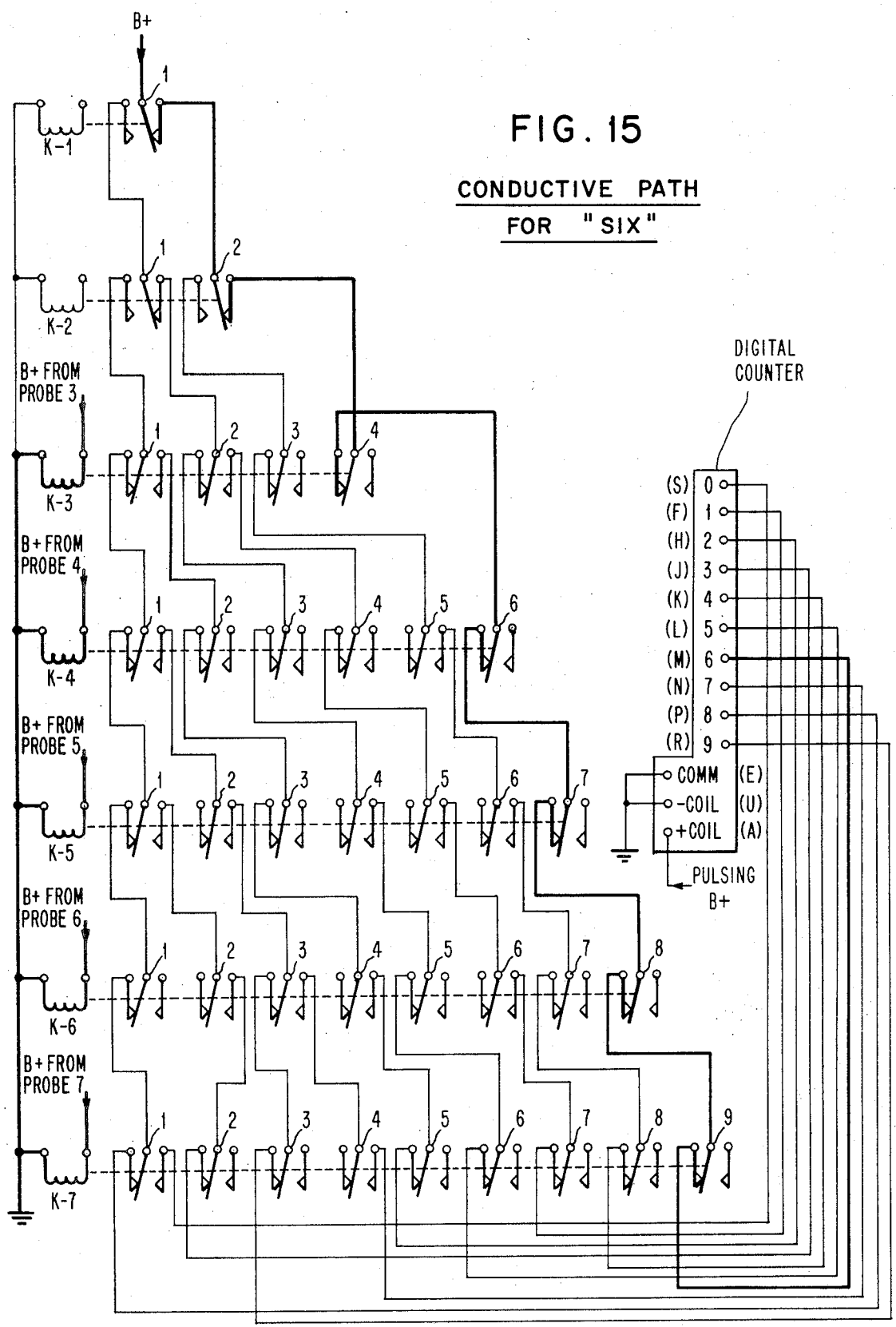
Figure 16:
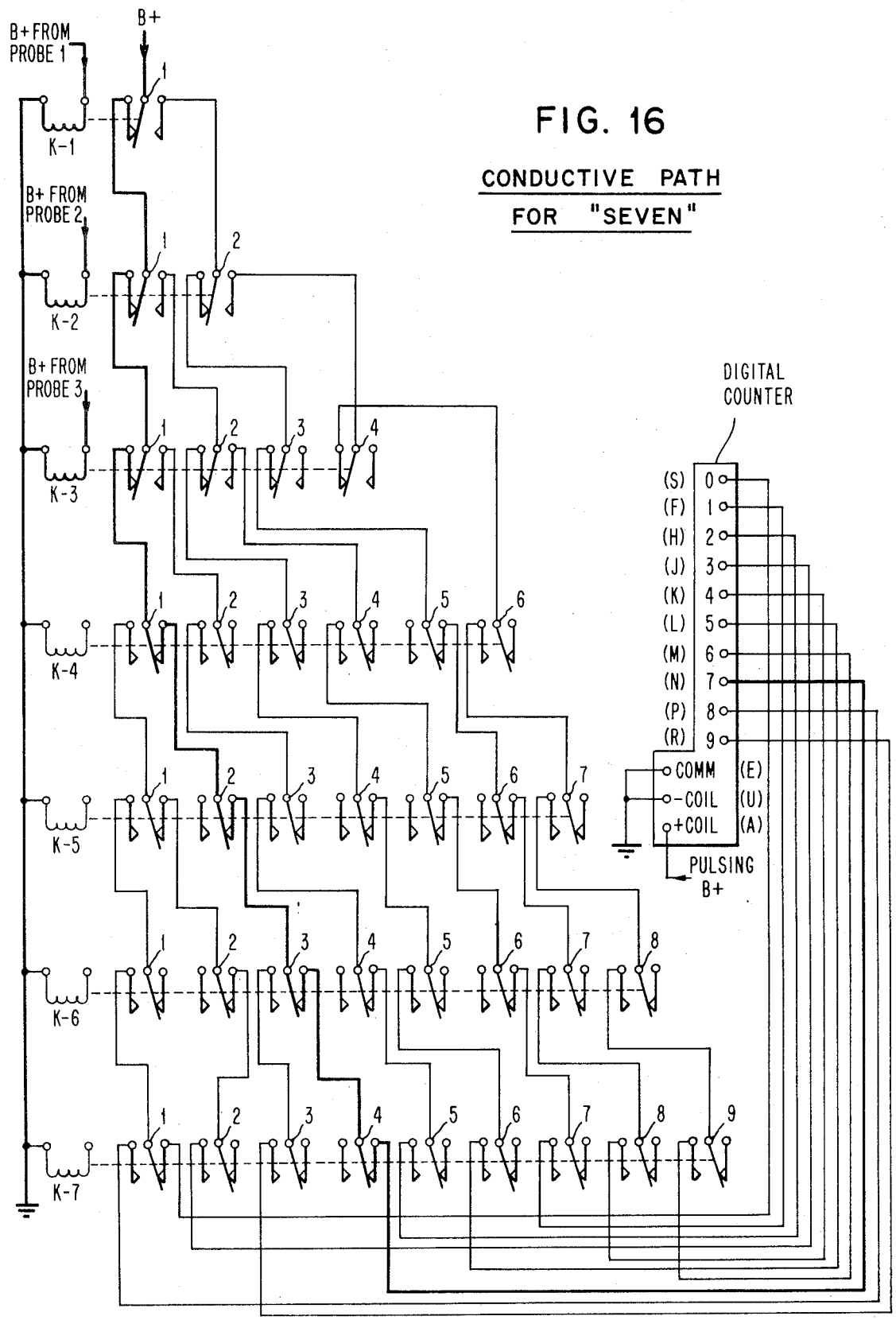
Figure 17:
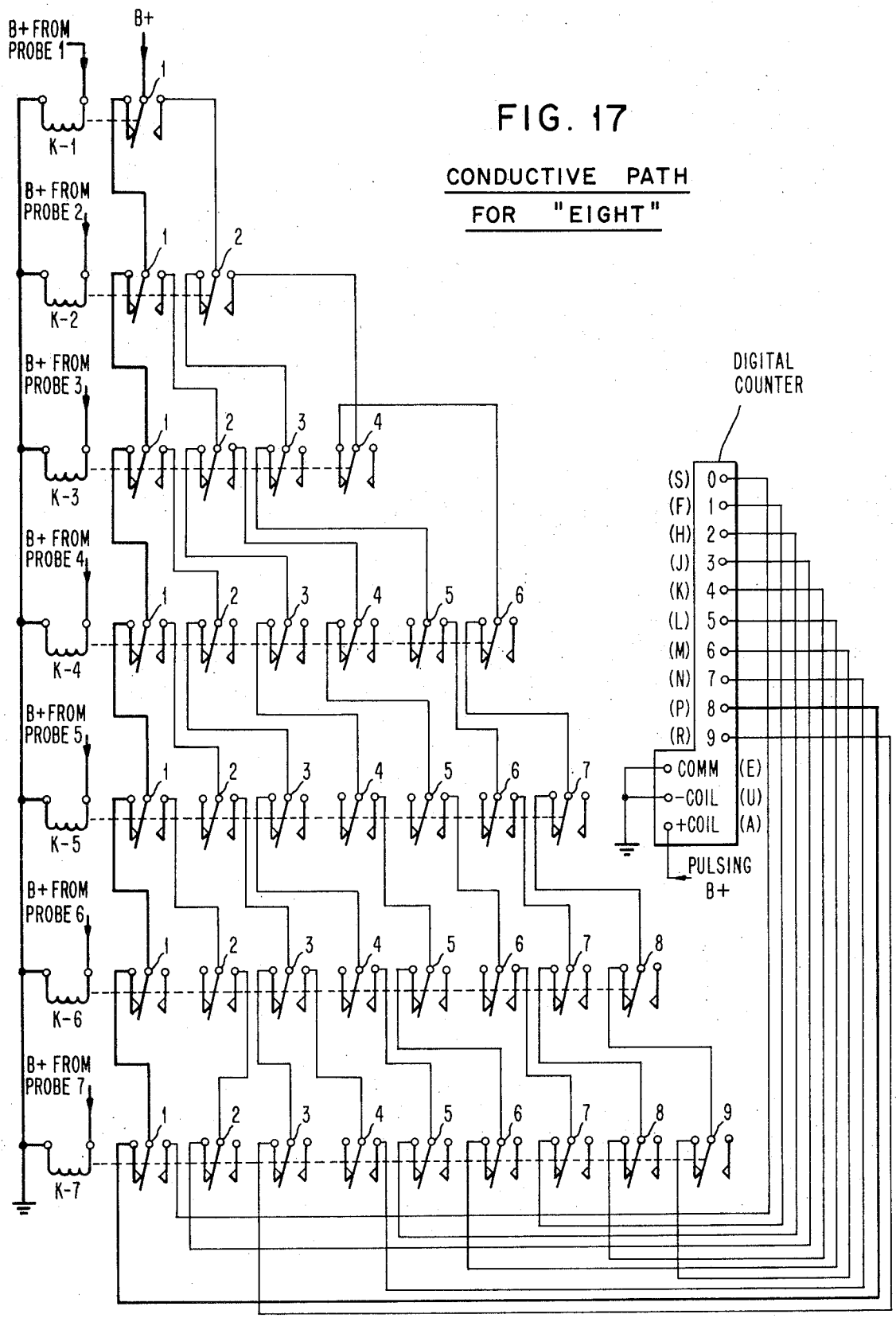

As an example of the operation of the relay tree 53, assume that the embossed numeral "five" is sensed by the probes of the matrix reader. Referring to FIG. 14, the voltage from the power supply is fed directly to the common contact of probe 1 of relay K–1 and is made available to each of the seven contacts for the given position on the credit card. The voltage from probes 1, 3, 4, 6, and 7 of the card reader is used to energize the coils of relays K–1, K–3, K–4, K–6, and K–7, respectively. Since probes 2 and 5 are not closed in the reader, the coils of relays K–2 and K–5 remain deenergized. At such time, the voltage from the common contact of relay K–1 is transmitted through the normally open contact of K–1 to the common contact of position 1 of relay K–2, through the normally closed contact of position 1 of relay K–2 to the common contact of position 2 relay K–3; through the normally open contact of position 2 of relay K–3 to the common contact of position 3 of relay K–4 to the common contact of position 4 of relay K–5; through the normally closed contact of position 4 of relay K–5 to the common contact of position 5 of relay K–6; through the normally open contact of position 5 of relay K–6 to the common contact of position 6 of relay K–7; through the normally open contact of position 6 of relay K–7 to terminal (L) of the counter which represents the digit 5 and causes the counter to register a 5.

It is readily understood that the relay tree as illustrated is merely to provide an understanding of the functioning of the reader apparatus. In actual practice, this relay tree would resolve itself into an array of solid state electronic modules of the AND/OR configuration primarily because of the space requirements. Alternatively, instead of having a relay tree or a solid state equivalent to read the embossed numeral from the card, it is possible to have a single tree tied to the output of a scanner which would sequentially connect the probes from each digit to the coils of the relays in the tree. Such an arrangement is illustrated in FIG. 19 wherein a typical scanner and memory decade is in the form of a telephone type stepping switch having a contact bank for each of the seven probe positions. If the credit card has 10 digits, the stepping switch would have ten contacts on each bank plus whatever control and timing switches are required. This would then enable one stepping switch and one relay tree to handle the complete readout of all embossed numerals on the credit card with a consequent reduction in cost and bulk.

From the above it is apparent that the proposed construction of a contact matrix assembly forming a portion of the apparatus of the subject invention lends itself to printed circuit type construction whereby a ten digit group would be repetitive or single fabrication. The use of the metal foil will automatically provide isolation of the reading contacts on the plastic credit card surfaces. Advancing the tape after each reading would provide clean electrical surface contacts on the top of the tape. Accordingly, even in the presence of grease or oil, the credit card could still be used to obtain accurate information for the recording of a sale. In addition, the credit card reader means will allow the use of a conventional plastic credit card as now used without the addition of magnetic ink, magnets, holes, metal plated portions, etc. Also, of primary importance is that the reader means of the subject invention is such that there are no working parts of an electrical contact nature as commonly found in relay contacts, sense pointing contacts, and other devices. Accordingly, the reliability of the subject apparatus is greatly improved.

The contact matrix assembly forming a portion of the apparatus of the subject invention may also be used as a module to supply intelligence information to the apparatus disclosed in U.S. Letters Pat. No. 3,073,519 entitled "Magnetic Ticket Punching Apparatus" which issued to William M. Booth on Jan. 15, 1963 and assigned to the assignee of the present invention. The combination of these apparatuses would allow the sales invoice to be punched at the point of sale and data processing ready upon receipt at the main office of the oil company.

In addition, the subject matter of the present invention may be employed to identify valid credit cards or to record sales in stations which are normally unattended, e.g., self-service retail installations or trucking fleet transactions.

Although the preferred embodiment of the invention has heretofore been described, it is to be recognized that other modifications and variations may be made without departing from the spirit and the scope of the invention. For example, the contact matrix assembly may be readily modified to "read" a metal credit card, of the type normally found in department stores, in which case the metal foil layer would not be required. A single additional probe could be added to apply B+ to the metal credit card or metal portion of a combined plastic/metal card.

What is claimed is:

1. Apparatus for electrically reading an embossed numeral on a conventional plastic card comprising:
   a. a contact matrix assembly including
      i. a circuit board having a plurality of leads and electrical contact probes, each probe extending beyond the lower surface of the board and connected at the upper surface thereof to one of said leads, said plurality of probes arranged in a pattern so that a different combination of probes are respectively contacted by the numerals zero to nine embossed on the credit card;
      (ii) resilient mask means disposed adjacent the lower surface of the circuit board and having a plurality of holes therethrough corresponding to the probe pattern, each probe disposed in the associated hole in the mask and having its lower end disposed above the lower surface of the mask; and
      (iii) electrically conductive foil tape of sufficient size to cover the probe pattern, with said foil tape being positioned between the embossed numeral on the credit card and the lower surface of the resilient mask;
   b. a source of electrical current connected to said foil tape;
   c. means for applying pressure between said contact matrix assembly and said credit card so as to cause the embossed numeral portion of the credit card to force the foil tape against the resilient mask and thereby compress the latter to establish electrical contact between the foil tape and the respective probes which are aligned with the embossed numeral; and
   d. electrical read-out means for receiving and processing the electrical signals from the contact matrix assembly.

2. Apparatus as in claim 1 wherein a plurality of contact matrix assemblies are provided corresponding to a similar plurality of numerals on the conventional plastic credit card.

3. Apparatus as in claim 1 wherein the contact matrix assembly includes seven probes, six of which are arranged in an array around a center probe.

4. Apparatus as in claim 1 wherein the electrically conductive foil tape is made of deformable metal.

5. Apparatus as in claim 1 wherein the electrical read-out means comprised of a relay tree is operatively associated with a scanner and memory decade.

* * * * *